United States Patent [19]
Berry et al.

[11] Patent Number: 6,136,174
[45] Date of Patent: Oct. 24, 2000

[54] COMPACT ELECTROSTATIC COALESCER

[75] Inventors: J. Patrick Berry; Stewart J. Mulvey, both of Calgary, Canada; Adrian G. Bailey, Ampfield, United Kingdom; Martin T. Thew, Ripon, United Kingdom; Trevor J. Williams, Romsey, United Kingdom; Nicholas J. Wayth, Amersham, United Kingdom; Olav Urdahl, Trondheim, Norway

[73] Assignees: Kvaerner Process Systems, Alberta, Canada; Den Norske Stats Olejeselskap A.S., Thondheim, Norway

[21] Appl. No.: 09/090,060

[22] Filed: Jun. 3, 1998

[51] Int. Cl.$^7$ .................................................. C10G 33/02
[52] U.S. Cl. .......................................... 204/671; 204/563
[58] Field of Search .................................... 204/563, 564, 204/565, 567, 568, 569, 570, 573, 670, 671, 672, 673

[56] References Cited

U.S. PATENT DOCUMENTS

| | | | |
|---|---|---|---|
| 1,405,124 | 1/1922 | Harris | 204/661 |
| 1,430,294 | 9/1922 | Eddy et al. | 204/671 |
| 2,092,491 | 9/1937 | Adams et al. | 204/563 |
| 2,855,356 | 10/1958 | Stenzel | 204/563 |
| 2,855,360 | 10/1958 | Waterman et al. | 204/666 |
| 2,872,408 | 2/1959 | Waterman et al. | 204/563 |
| 2,892,768 | 6/1959 | Waterman et al. | 204/666 |
| 3,073,775 | 1/1963 | Waterman | 204/671 |
| 3,117,920 | 1/1964 | Stenzel et al. | 204/671 |
| 3,454,484 | 7/1969 | King, Jr. et al. | 204/554 |
| 3,674,677 | 7/1972 | Roberts | 204/670 |
| 3,701,723 | 10/1972 | Cole et al. | 204/563 |

OTHER PUBLICATIONS

O. Urdahl, T.J. Williams, A.G. Bailey, and M.T. Thew "Electrostatic Destabilization of Water–In–Oil Emulsions Under Conditions of Turbulent Flow"—Institution of Chemical Engineers—Trans IChemE, vol. 74, Part A, Mar. 1996.

I.G. Harpur, N.J. Wayth, A.G. Bailey, M.T. Thew, T.J. Williams, and O. Urdahl "Destabilization of Water–In–Oil Emulsions Under the Influence of an A.C. Electric Field: Experimental Assessment of Performance"—Journal of Electrostatics, 40 & 41, (1997), pp. 135–140.

Knut H. Nordstad, Karl–Petter Loken, Gunnar Vangen, Olav Urdahl "Light Weight Separation Equipment (LISE) for Oil Production" The 4th Annual Event Production Separation Systems Forum Oslo May 29 & 30, 1997.

*Primary Examiner*—Kathryn Gorgos
*Assistant Examiner*—William T. Leader
*Attorney, Agent, or Firm*—James G. O'Neill

[57] ABSTRACT

A compact device for coalescing finely dispersed droplets of a conductive fluid emulsified in a stream of nonconductive fluid by the use of a high intensity electric field acting on the emulsion as it flows through a narrow flow gap under non-laminar flow conditions. The emulsion is introduced into the top of a vertically mounted cylindrical vessel or shell, and flows through one or more narrow, annular flow gaps formed between one or more electrodes, or an internal wall of the device. The broken emulsion is discharged from the bottom of the vessel, after having a short residence time in the high-intensity electrostatic field. The flow of the emulsion in the one or all of the narrow, annular flow gaps is non-laminar to provide substantially smaller equipment size, even with emulsions having high water content therein.

6 Claims, 4 Drawing Sheets

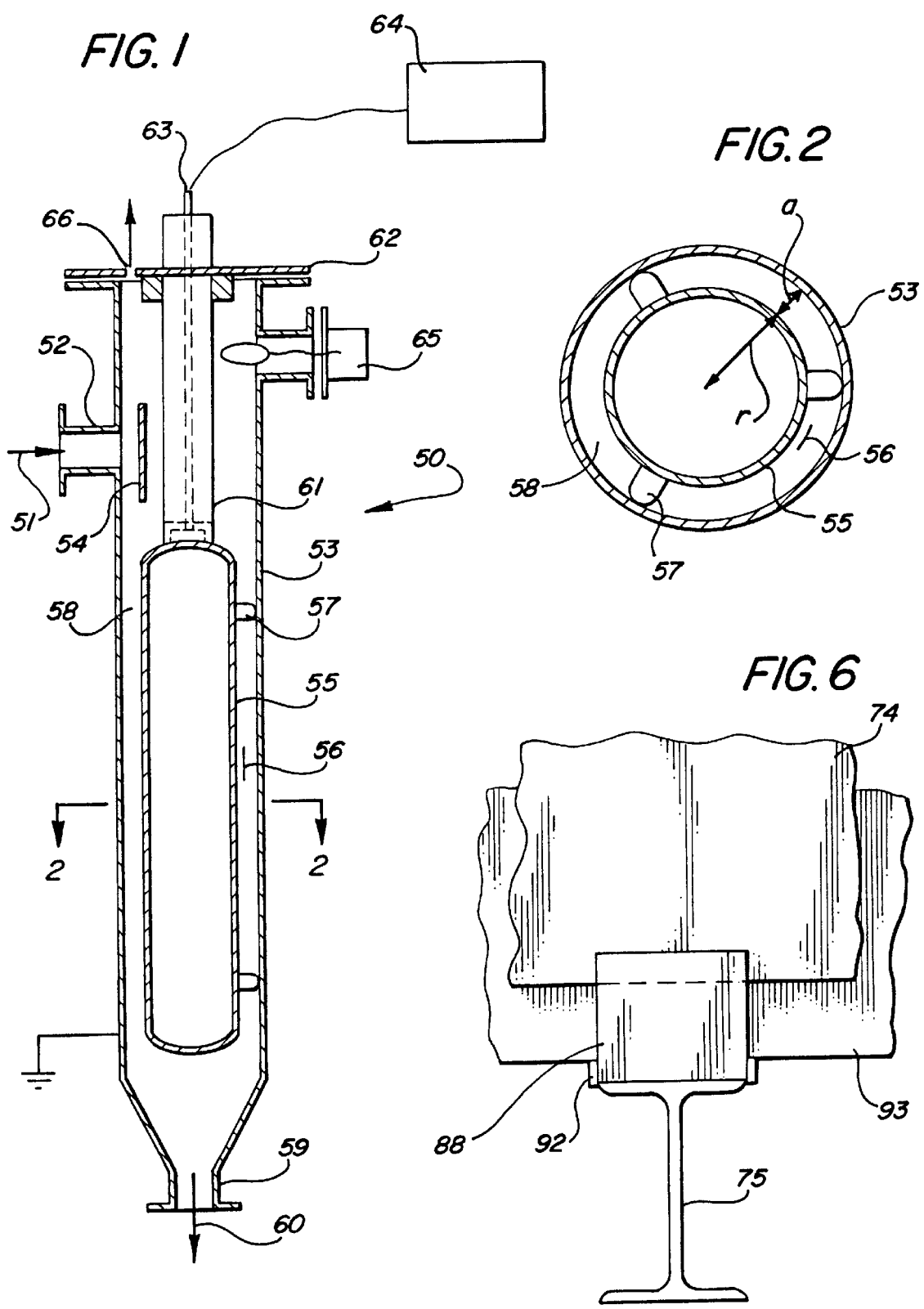

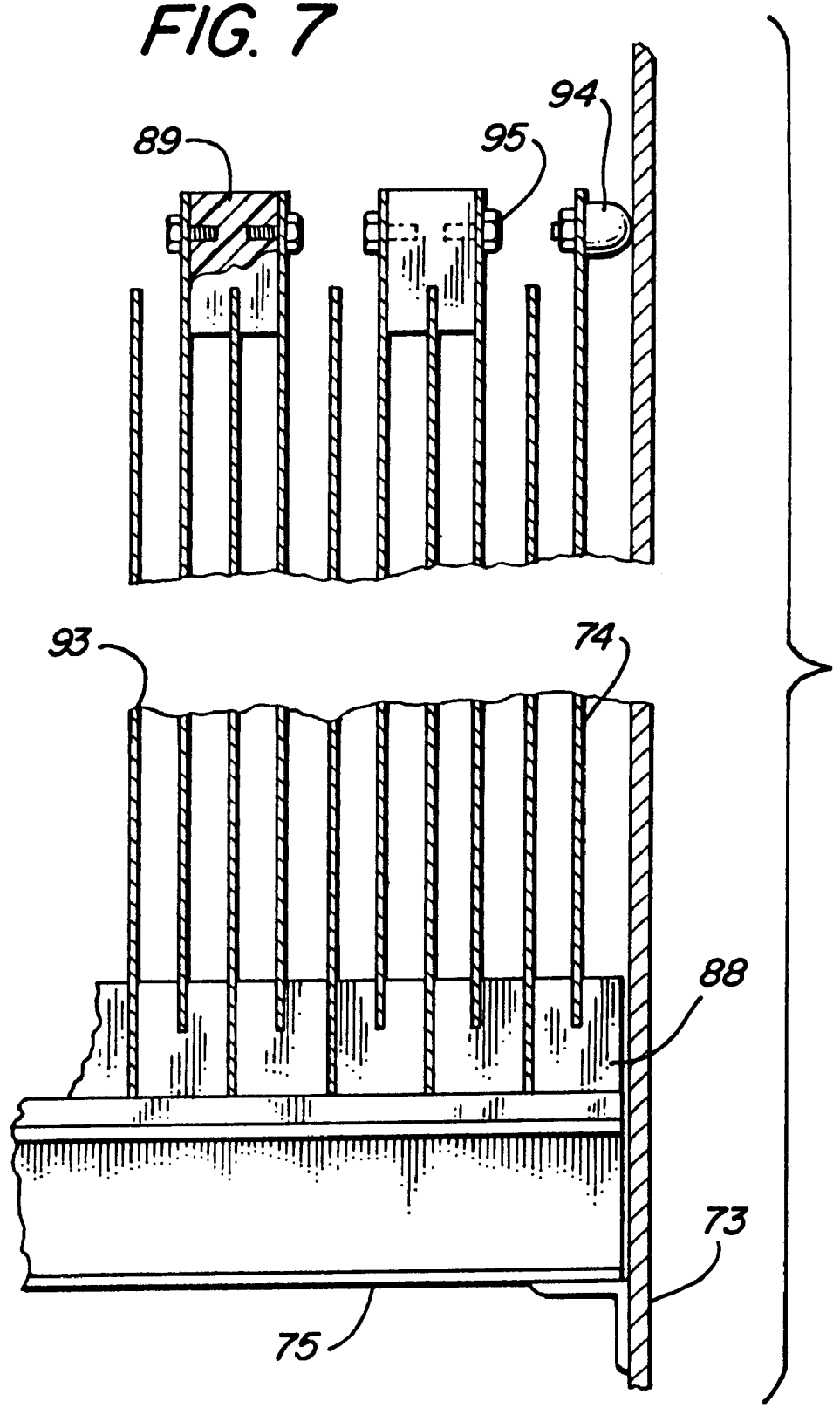

COMPACT ELECTROSTATIC COALESCER

BACKGROUND OF THE INVENTION

1. Field of the Invention

This invention relates generally to electrostatic coalescers, and, more particularly, to an improved and compact coalescer, in which a turbulent flow of emulsion is passed through narrow flow channels and subjected to a high intensity field for more effective coalescing action.

2. Description of Related Art

The use of electrostatics to enhance the coalescence of water droplets in an oil continuous emulsion has been used by the oil industry for many years. Electrostatic coalescers are commonly used at oil producing facilities to remove unwanted water from the crude oil, and are also used at refinery facilities to remove salt (dissolved in water) from crude feed stock. Commercial electrostatic dehydration equipment is available from a number of reputable manufacturers, including Kvaerner Process Systems of Calgary, Canada, the assignee of the present invention, in different parts of the world. This equipment may use proprietary designs, but they are all based on the same principles. Namely, an emulsion containing a dispersed water phase is introduced into a zone subjected to an electrostatic field. The electrostatic field causes the dispersed water droplets to coalesce by polarizing adjacent drops and causing a dielectrophoretic force of attraction between them. After small water droplets have coalesced into larger droplets, they are separated by gravity. Traditionally the emulsion is treated in a large vessel so that the fluid velocity is very small, allowing the water droplets to settle to the bottom of the vessel where the water can be removed. The electrodes used to impose the electrostatic field inside the vessel are normally quite large and spaced in a manner to minimize disruptions to the fluid flow patterns that could cause mixing of the water droplets in the oil phase.

Applied voltages to create the electrostatic fields in typical commercial units range from 10,000 to 30,000 volts (rms voltage given throughout document). Operating voltage settings of 15,000 to 20,000 volts are common. This requires carefully designed and expensive insulators, electrode hangers and entrance bushings. The high voltage bushings are subject to failure due to the severe service and difficult operating environment with temperatures reaching up to 150° C. (300° F.). This requires periodic shutdowns for replacement of worn or failed bushings.

Depending on the process conditions and the design of the electrostatic coalescer, problems can occur when emulsions with high water concentrations enter an electrostatic field. Many commercial electrostatic coalescers utilize bare metal electrodes or grids. High water concentrations greatly increases the conductivity of the emulsions, and with the high voltages applied to the field, large current draws can occur and even shorts to ground. This can cause both process and equipment failures. To avoid this situation, the traditional approach has been to locate the energized electrodes well away from the grounded electrodes or any other grounded part of the system, or to pretreat the emulsion to remove much of the water. Traditional spacing inside commercially available electrostatic coalescers is about 9 to 24 inches between electrodes and ground. This large spacing between electrodes causes a less intense electrostatic field to be generated, and is, thus, less effective in coalescing water droplets. Dehydration performance deteriorates.

Recent laboratory research work carried out by Statoil of Norway and the University of Southampton in England, has demonstrated the destabilization of water-in-oil emulsions using electrostatics under turbulent flow conditions. This work has led to the development of new electrode configurations that can be used in a wide variety of commercial electrostatic coalescers. The new configurations enable small water droplets to coalesce into larger droplets while flowing turbulently. Turbulent flow provides good mixing which increases the probability of water drops coming into close proximity with other water drops. This is achieved by creating high flow velocity within narrow flow channels between electrodes. Lower voltage is used with this new electrode configuration, however, and because the electrodes are more closely spaced, higher field intensities than in conventional units are actually observed. This higher field intensity, coupled with the turbulent flow between the electrodes, results in more effective and improved coalescing action. However, there is a limit to which field intensity and turbulent mixing will be effective because water drops can break up under the action of an extremely intense field and turbulence induced stresses.

The energized electrodes are insulated with a layer of material with high dielectric strength. This prevents high current flow and short circuits when a water-in-oil emulsion with high water concentration enters the field, thus eliminating the need and cost of pretreatment of the emulsion. The new electrode configurations can handle water cuts in excess of 40%, up to the point where the emulsion inverts and the water become the continuous phase.

SUMMARY OF THE INVENTION

It is, therefore, a general object of the present invention to provide an improved coalescer of compact design. It is a particular object of the present invention to provide an improved coalescer in which turbulent flow occurs between closely-spaced electrodes. It is also a further particular object of the present invention to provide a compact coalescer in which turbulent flow of a water-in-oil emulsion passes, for short periods of time, through concentric electrodes spaced a minimum distance apart to which a high intensity electrostatic field is applied.

The present invention embodies a set of parameters for forming a set of electrodes to be used more effectively for coalescing water droplets in an oil continuous emulsion. The electrodes are closely spaced, and can be used in conventional dehydration equipment, desalters, or in new compact designs that are inline-type devices made primarily for offshore production services.

The main features of the new electrode configuration are: 1. Narrow electrode spacing and small flow gap; 2. straight through flow path; 3. turbulent flow or transitional flow; 4. flat or low curvature electrode arrangement; 5. insulation between electrodes; 6. vertical flow; 7. flow parallel to electrodes, not perpendicular or through an electrode grid; 8. high intensity electric field; 9. short residence time. The electrode configuration can be a flat parallel plate arrangement, or can be cylindrical. However, the cylindrical arrangement must meet certain geometric criteria so as to approach a flat-plate geometry. This is important so as to keep a relatively uniform electrostatic field between the electrodes. Rods, slender pipes and tubes, or wire electrodes, should not be used for this type of electrode configuration. If multiple electrodes are used, there must be a device to distribute the emulsion evenly to multiple flow channels past the electrodes. This can be achieved by way of a perforated baffle at either the inlet or outlet of the multiple electrode assemblies. Other distribution methods can also be used so long as they provide for even non-laminar hydraulic flow of fluids through the narrow flow gaps between electrodes.

The preferred orientation for cylindrical electrodes is such that the axis of the cylinder is vertical. This is because coalesced water droplets will begin to settle by gravity and the vertical orientation prevents a water layer forming next to one electrode. A layer of water will change the electrostatic field.

The electrode configuration of the preferred embodiments described herein has a layer of high voltage electrical insulation on the energized electrode surface while the grounded electrode surfaces are bare. There are a number of different places to provide an insulating layer such as with the insulating material on the grounded electrode surface with the energized surfaces bare, or with the insulating material on both electrode surfaces. The invention will work as described as long as there is an insulating layer between opposing surfaces of the electrodes. It is important that the electrode surface with the insulating layer be completely encapsulated so that there are not any holes or openings that would allow an electrical short circuit between electrodes via chained water droplets. The insulating material must have a sufficiently high dielectric strength to prevent electrical flashover discharge at the voltages applied.

The electrode configuration of the present invention is intended for use in liquid packed systems only. Although small gas bubbles that break out of the oil while in the electrostatic field do not affect the performance, the electrode assembly should always be submerged in the emulsion. The electrodes should be installed below the gas liquid interface of an operating vessel or tank.

Because of the narrow flow channels between or in the electrode configuration, they are not intended for use in emulsion streams that contain large quantities of solids. Fine solids will be carried right through the flow channels in the electrode assembly, due to the turbulent nature of the flow, and also due to the straight through and vertical flow path. There are no dead zones in the electrode assembly that will trap solids. The size and quantity of solids expected in the inlet emulsion stream will affect the final selection of electrode spacing. Larger solid particles will require larger flow channels. Smaller flow channels will have a greater tendency to plug. Solids may be removed upstream of a coalescer using known technology, such as sand traps or cyclones.

The electrode configuration of the present invention is an open design that can operate over a wide range of pressures. It can be used in an atmospheric tank, or inside a pressure vessel rated for very high pressures. Operating at less than atmospheric pressure is also possible. The electrode configuration can operate within a temperature range of approximately −50° C. to 150° C. (−58° F. to 300° F.). The temperature limitation is a function of the insulating material used on the energized electrodes. The electrode configuration can be used on virtually any crude oil and most refined or manufactured oils. The continuous phase of the emulsion should be relatively non-conductive to electricity compared to water that is much more conductive.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a schematic elevational view, partially in cross-section, showing one embodiment of a compact coalescer of the present invention, having a single narrow flow annulus with short residence time used to subject a water-in-oil emulsion to an intense electrostatic field, under turbulent flow conditions;

FIG. 2 is a cross-sectional view taken along lines 2—2 of FIG. 1;

FIG. 6 is a cross-sectional view, taken along line 6—6 of FIG. 4; and

FIG. 7 is a cross-sectional view, taken along line 7—7 of FIG. 5.

DESCRIPTION OF THE PREFERRED EMBODIMENT

Figure 3:
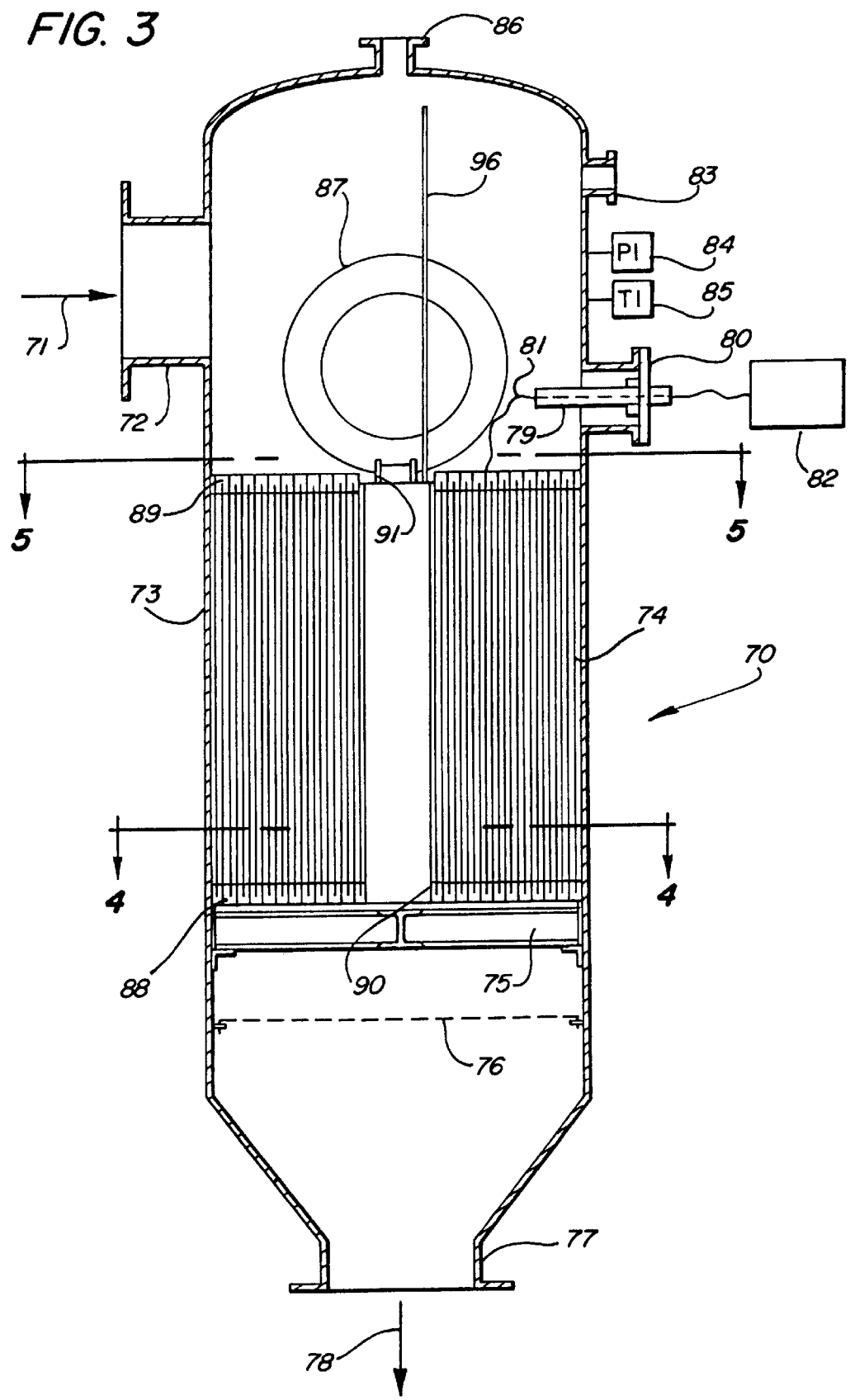
FIG. 3 is a schematic elevational view, partially in cross-section of a further embodiment of the compact coalescer of the present invention, used for large scale production requirements, and having a multi-annulus electrode configuration.

The following description is provided to enable any person skilled in the art to make and use the invention, and sets forth the best modes contemplated by the inventors of carrying out their invention. Various modifications, however, will remain readily apparent to those skilled in the art, since the generic principles of the present invention have been defined herein, specifically to provide for an improved and simplified compact coalescer, using at least one set of closely-spaced electrodes to define at least one narrow flow gap in which an intense electrostatic field is applied for short periods of time, to a water-in-oil emulsion, moving through the narrow flow gap under turbulent flow conditions.

Recent studies done by Statoil of Norway and the University of Southampton in England have demonstrated the destabilization of water-in-oil emulsions using intense electrostatic fields under turbulent flow conditions. Reports of these studies and the conclusions reached thereby, are set forth in three published papers, identified below:

1. Urdahl, O., Williams, T. J., Bailey, A. G. and Thew, M. T., Electrostatic Destabilization of Water-in-Oil Emulsions under Conditions of Turbulent Flow, Chem Eng Res Des 74(A2) (1995)158–165;

2. Nordstad, Knut H., Loken, Karl-Petter, Vangen, Gunnar, and Urdahl, Olav, Light Weight Separation Equipment (LISE) for Oil Production;

3. Harpur, I. G., Wayth, N. J., Bailey, A. G., Thew, M. T., Williams, T. J., and Urdahl, O., Destabilization of Water-in-Oil Emulsions Under the Influence of an A.C. Electric Field: Experimental Assessment of Performance.

The contents of each of these three published papers is incorporated herein in its entirety by this reference thereto.

Turning now to the drawings, there shown are preferred embodiments of commercial applications using narrow electrode spacings, with a short residence time, having turbulent flow of a water-in-oil emulsion therethrough, and the use of intense electrostatic fields. In particular, FIG. 1 shows a compact coalescer 50 having a non-laminar emulsion flow stream 51 entering an inlet nozzle 52 of a vertical, exterior pressure-containing shell 53, which is electrically grounded. An internal baffle shield 54 deflects the emulsion flowing into the internal chamber of the pressure-containing shell 53 to the outer edge of the chamber so that the incoming fluid does not impinge on the entrance bushing 61. The emulsion then flows downwardly past an internal electrode 55, preferably in the form of an annulus (see FIG. 2), having a radius "r". The annulus, or internal electrode 55 is centered within the internal chamber of shell 53 by means of a plurality of electrode centralizers 57, spaced around the electrode. A flow gap 58 is provided between an insulating layer 56, having good dielectric strength, such as a fluropolymer, or the like, on the external surface of the electrode 55 and an internal wall of the shell 53. This flow gap 58 is indicated as "a", and in a preferred embodiment of the invention, is approximately 1.6 centimeters, but which may vary from about 1 centimeter to about 5 centimeters. The preferred ratio of the flow gap 58, to the radius "r" of the electrode, i.e., a÷r, is zero, and should not be greater than 0.30. That is, the electrodes are preferably flat, but if not, of low curvature where the radius of the electrode should be maintained as large as possible, and the space between the exterior of the electrode and the inner wall of the outer shell should be kept as small as possible, while still allowing non-laminar flow.

One example of flat plate electrodes is shown in the papers referred to above, and another could comprise a plurality of rectangular electrodes held within the internal chamber of a shell such as 53. The shell would also include a means, such as a baffle, or the like, to direct non-laminar flow between narrow flow gaps in the rectangular electrodes.

In order that the compact coalescer of the present invention will enable dispersal of droplets of a conductive fluid, such as water, emulsified in a stream of nonconductive fluid, such as oil, the droplets must be coalesced to a large enough size that they will easily separate, by gravity, from the continuous phase (break the emulsion). This is caused by the use of a high-intensity electrostatic field. The present invention combines and uses the coalescing affect of a high intensity electric field, flat or large diameter electrodes, and a small flow gap for the emulsion under non-laminar or turbulent flow conditions. As is well known, in a fluid, a Reynolds number (flow in a duct or pipe) of less than 2,000 usually indicates laminar flow. While a Reynolds number between 2,000 to 5,000 is normally termed the "transition zone", and a Reynolds number over 5,000 generally indicates turbulent flow. The compact coalescer of the present invention is used with fluids having non-laminar flow with Reynolds numbers of between 2,000–8,000 to produce the best results, depending on the fluid viscosity, geometry of flow, etc. Although the present invention is designed to operate under turbulent flow conditions (high flow rates), it will continue to function under laminar flow conditions (low flow rates), due to longer residence times, provided the water droplet concentration is not too low.

Turning again to FIG. 1, the water-in-oil emulsion flows along the length of electrode 55, in the flow gap 58, with a short residence time of typically 3–10 seconds, or longer, if required, and is discharged from the bottom of the shell 53 through an outlet nozzle 59, as shown at 60. The electrode 55 is selected to have a length which allows adequate electrical residence time for a given water-in-oil emulsion, and is electrically connected to a power source 64, such as a high voltage transformer, mounted exteriorly of the shell. The entrance bushing 61 mounted on a hanger flange 62 allows a hanger rod 63, connected to the high voltage transformer 64, to sealingly extend through the shell into contact with the upper portion of the electrode 55. The upper portion of the vertical shell 53 is provided with a low-level shutdown switch 65, and a gas vent outlet 66. The electrode 55 is energized with an electrical potential selected to produce the desired electrostatic field, which may be up to 15,000 volts, while the electrical residence time of emulsion passing through the intense electrostatic field is preferably the 3–10 seconds mentioned above. This compact coalescer is capable of handling non-laminar flows of very high flow rate, and is extremely small and compact when compared to a conventional coalescer having the same design capacity.

Figure 5:
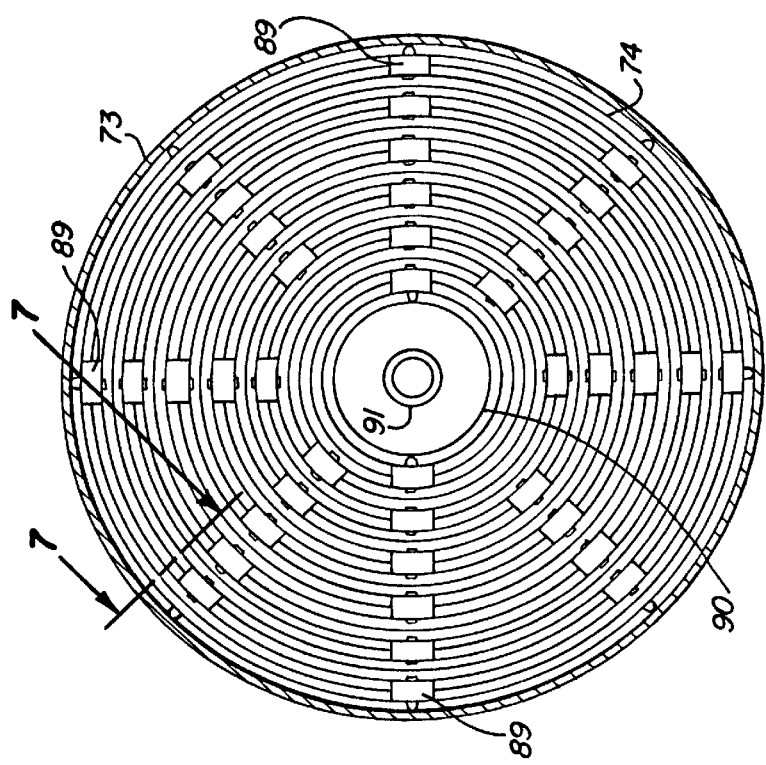
FIG. 5 is a further cross-sectional view, taken along line 5—5 of FIG. 3.
Figure 4:
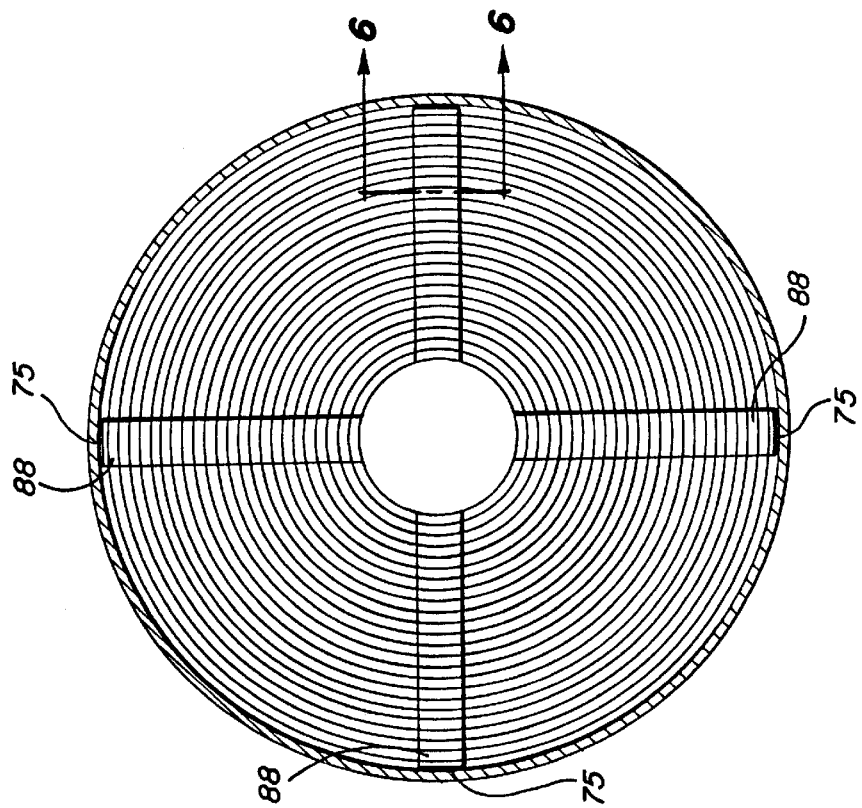
FIG. 4 is a cross-sectional view, taken along line 4—4 of FIG. 3.

Turning now to FIGS. 3–7, there shown is a second embodiment of the present invention, comprised of a large-scale, multi-annulus electrostatic coalescer 70 having a non-laminar emulsion flow stream 71, flowing through an inlet nozzle 72 of an exterior pressure-containing shell 73, which is electrically grounded. An electrode array comprising a plurality of cylindrical electrodes 74, forming a plurality of spaced, concentric cylinders is mounted within the internal chamber of the shell 73, as by means of an electrode-support structure 75. A flow distribution baffle 76, which is preferably perforated, is shown mounted within the shell 73, after the plurality of electrodes 74, and before an outlet nozzle 77 through which the broken oil and water emulsion exits at 78. Power is supplied to the array of electrodes 74 via a power source 82 sealingly connected through the side wall of the shell 73, via an entrance bushing 79, held in an entrance bushing hanger flange 80. A high voltage wire 81 connects the array of electrodes 74 to the bushing 79, and to the high voltage transformer 82. The shell 73 includes a low-liquid-level shutdown switch 83, and may also include a pressure gauge 84 and a temperature gauge 85. The atop of the shell is provided with a gas vent outlet 86 and can be provided with a manway 87. A gas bleed tube 96 allows any gases trapped in the bottom zone of the vessel to escape to the top without backflowing up through the electrostatic field between the electrodes.

As best shown in FIGS. 4–7, the array of electrodes 74 have a plurality of energized electrode insulators/spacers 88 at lower or bottom ends thereof, and grounded electrode insulators/spacers 89 at upper or top ends thereof. The array of electrodes 74 are provided with an inner mandrel 90 and an upper electrode assembly lifting connection 91. The bottoms of the array of electrodes, are supported by the electrode support structure 75, and include guide plates 92 to hold the energized electrode insulators/spacers 88. Additionally, alternate electrodes in the concentric array are grounded, as shown by the bare grounded electrodes 93.

The upper end of the outer cylindrical concentric electrode includes a plurality of electrode centralizers 94 mounted thereon, adjacent the inner wall of the shell 73, to insure that the outer cylindrical electrode does not contact the inner wall of the shell. Additionally, at the upper end of each of the grounded electrodes, there are provided grounded electrode insulator/spacer set screws 95, holding the grounded electrode insulator/spacers 89 in position between adjacent concentric electrodes. Non-laminar flow of emulsion is through the narrow spaces "a" provided between the concentric electrodes of different radii "r", and an intense electrostatic field is applied to the emulsion evenly along the length of the electrodes.

It therefore can be seen, that the present invention provides an improved compact coalescer for coalescing finely dispersed droplets of a conductive fluid, such as water-in-oil, emulsified in a stream of nonconductive fluid flowing through one or more substantially narrow flow channels of width "a" in a non-laminar flow, and wherein a substantially large electric potential is applied across the water-in-oil emulsion, by one or more specifically designed electrodes with the electrical residence time being approximately 3–10 seconds.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An electrically energized compact coalescer for breaking water-in-oil emulsions, comprising:

an elongated, closed, vertically disposed shell, having at least one fluid inlet at a top, and at least one fluid outlet at a bottom;

a first insulated, cylindrical electrode, having a constant radius along a length thereof vertically mounted in an internal chamber formed in the elongated, closed, vertically disposed shell to form a first annular flow gap along the length of the first insulated, cylindrical electrode;

the first insulated, cylindrical electrode having a radius of "r", and the first annular flow gap being formed between the first insulated, cylindrical electrode and a wall of the internal chamber, whereby a water-in-oil emulsion, fed into the at least one inlet, will pass into the internal chamber and then flow vertically downward through the first annular flow gap in a non-laminar manner, toward the at least one fluid outlet, and have an electrical residence time in the first insulated cylindrical electrode of approximately 3–10 seconds;

the first annular flow gap having a width of "a", which width is larger than one centimeter, and wherein the ratio of "a" to "r" is less than 0.30;

a power supply formed externally of the elongated, closed, vertically disposed shell; and means for establishing an electrical connection between the power supply and the first insulated cylindrical electrode, to enable an intense electrostatic field to be applied to the water-in-oil emulsion passing through the first annular flow gap.

2. The compact coalescer of claim 1 wherein the non-laminar flow of water-in-oil emulsion through the first annular flow gap has a Reynolds number over 2000.

3. The compact coalescer of claim 2, further comprising a plurality of additional elongated, insulated, cylindrical electrodes, each having a different radius "r" smaller than the radius "r" of said first insulated cylindrical electrode; the additional elongated, insulated, cylindrical electrodes being mounted in the internal chamber to form a plurality of additional annular flow gaps, each having the same width "a" as said first annular flow gap, and wherein "a" divided by "r" is always between 0 and 0.30.

4. The compact coalescer of claim 1 wherein the width "a" is between one centimeter and five centimeters, the ratio of "a" to "r" is between zero and 0.30, and the non-laminar flow through the at least one annular flow gap has a Reynolds number between 2000 and 8000.

5. An electrically energized compact device for coalescing a conductive fluid emulsified in a stream of nonconductive fluid, comprising:

an elongated, closed, vertically disposed shell, having a fluid inlet at a top, and a fluid outlet at a bottom;

a plurality of insulated, concentric, cylindrical electrodes, vertically mounted in an internal chamber formed in the elongated, closed, vertically disposed shell;

the plurality of insulated, cylindrical electrodes each having a different radius "r" and being sized and dimensioned so as to form a plurality of annular flow gaps of equal width "a" between the plurality of insulated, cylindrical electrodes, whereby flow of the emulsion into the internal chamber and vertically through the plurality of annular flow gaps will be non-laminar and have an electrical residence time in the plurality of insulated, cylindrical electrodes of approximately 3–10 seconds;

the equal width of "a" of each of the plurality of annular flow gaps being between one centimeter and five centimeters, and whereby "a" divided by "r" for each of the plurality of cylindrical electrodes is less than 0.30;

a power supply formed externally of the elongated, closed, vertically disposed shell; and means for establishing an electrical connection between the power supply and the plurality of insulated, cylindrical electrodes to enable an intense electrostatic field to be applied to the stream of non-conductive fluid passing through the plurality of annular flow gaps.

6. The compact coalescer of claim 5 wherein the non-laminar flow of the stream of non-conductive fluid through each of the equal width, annular flow gaps has a Reynolds number between 2000 and 8000.

* * * * *